March 19, 1940.  Ö. RISZDORFER  2,194,031
APPARATUS FOR LIGHT CONTROL
Filed March 15, 1935  2 Sheets-Sheet 1
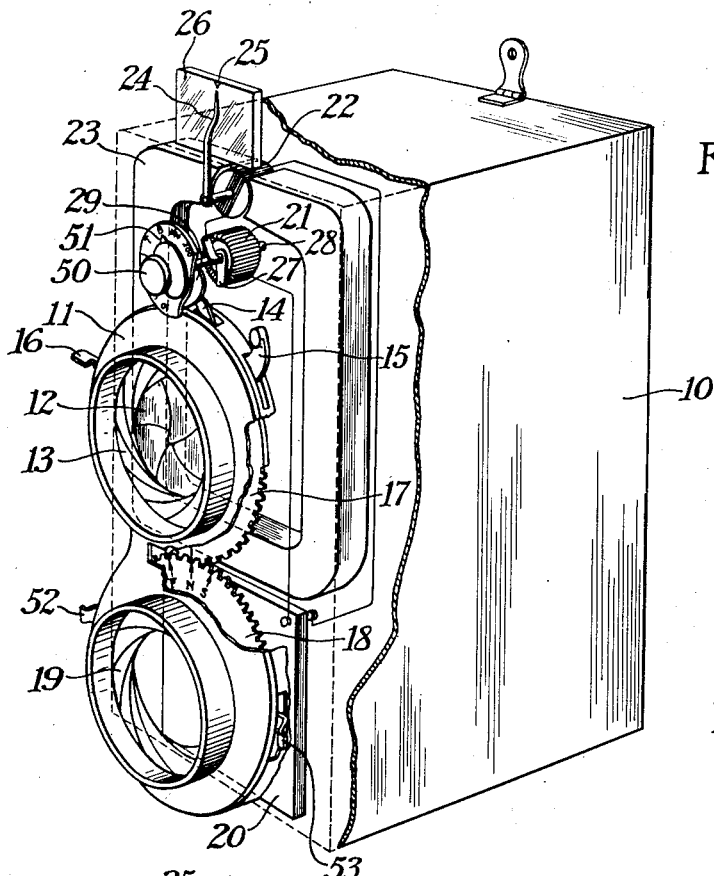
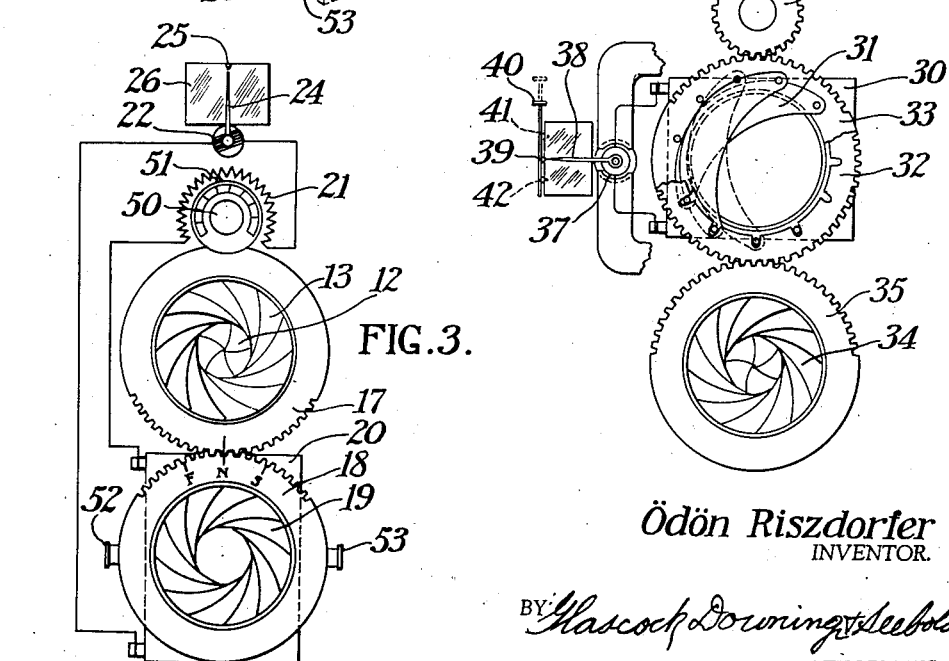
Ödön Riszdorfer
INVENTOR.
ATTORNEYS March 19, 1940.   Ö. RISZDORFER   2,194,031
APPARATUS FOR LIGHT CONTROL
Filed March 15, 1935   2 Sheets-Sheet 2

Ödön Riszdorfer
INVENTOR.

BY Glascock Downing & Seebold
ATTORNEYS

Patented Mar. 19, 1940

2,194,031

UNITED STATES PATENT OFFICE 2,194,031

APPARATUS FOR LIGHT CONTROL

Ödön Riszdorfer, Budapest, Hungary

Application March 15, 1935, Serial No. 11,367
In Hungary March 16, 1934

11 Claims. (Cl. 95—10)

This invention relates to photographic cameras and particularly to photo-electric apparatus for facilitating the proper adjustment of the camera exposure control devices to assure proper exposure for the then existing light conditions. Certain specific embodiments of the invention claimed herein were disclosed in my application Serial No. 693,204, filed October 11, 1933, which resulted in Patent No. 2,076,481, dated April 6, 1937.

It is an object of this invention to provide photo-electric apparatus for a camera whereby when one exposure factor is preselected and the other factor adjusted until a predetermined response is obtained in the photo-electric apparatus the camera will be set for proper exposure.

Another object of the invention is the provision of means for correlating the sensitivity of the photographic film being used in a camera with the exposure factors directly taken into account by the photo-electric apparatus.

Other objects and advantages of the invention will become apparent from the following description when read in connection with the accompanying drawings and its scope will be pointed out in the appended claims.

In the drawings:

Fig. 1 is a perspective view, partly in section and partly broken away, showing one form of the invention applied to a camera;

Fig. 2 is a diagrammatic view showing a modified arrangement for adjusting the exposure control devices of the camera;

Fig. 3 is a diagrammatic front view showing certain parts of the apparatus shown in Fig. 1;

Figure 4:
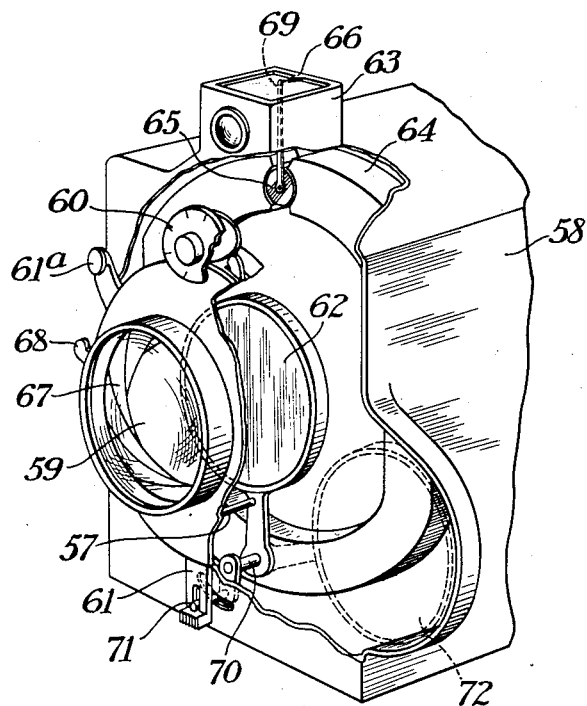
Fig. 4 is a partial view in perspective of a camera equipped with an electric photometer having its light sensitive cell removably positioned behind the camera lens.

Fig. 1 shows a photographic apparatus in the form of a box camera 10 provided with exposure control apparatus embodying one form of the invention. In the front wall of the camera 10 is secured by appropriate means a casing 11 which supports in a known manner the camera objective (not shown) and forms a housing for mechanisms such as a shutter 12 and a diaphragm 13 for controlling the exposure of photographic sensitive material supported in the camera 10 in any usual manner. The shutter mechanism enclosed in the housing 11 includes a pin 14 adjustable for setting the speed of the shutter, a lever 15 for winding the shutter mechanism and an arm 16 for releasing the shutter, all of which is well known. The diaphragm 13 which may be of any known type governs the transmission of light through the objective and is adjustable by means of a toothed disc 17 which meshes with another toothed disc 18 forming the adjusting means for a second diaphragm 19 whereby the mutual positive connection causes the diaphragms 13 and 19 to open and close simultaneously. The diaphragm 19 is preferably provided with a lens (not shown) which is the light transmitting equivalent of the camera objective.

In accordance with the invention, a light sensitive electrical device is provided for indicating when the exposure control devices, i. e., the shutter and the diaphragm, are properly adjusted for the existing light conditions. This electrical device includes a light sensitive cell 20, which preferably is of the photo-voltaic type, positioned to receive light transmitted by the auxiliary diaphragm 19 and connected in series with a resistance 21 and an electrical measuring instrument 22. The coil of the measuring instrument 22 is arranged in a known manner in the field of a magnet 23 and is provided with a pointer 24 which cooperates with a fixed mark 25 to indicate a proper setting of the exposure controlling devices 12 and 13. The pointer 24 and the fixed mark 25 may be located in any observable position and are here shown as arranged in the immediate vicinity of the front element 26 of the view finder with which the camera 10 is equipped.

The magnitude of the resistance 21 included in the cell circuit is adjustable by means of a sliding contact 27 carried by a shaft 28 on which is mounted a cam 29 engaging with the shutter speed setting pin 14. A suitable knob 50 for rotating the shaft 28 is provided with an index 51 for indicating the shutter setting. It is thus seen that adjustment of the shutter speed correspondingly adjusts the resistance 21 to vary the reading of the measuring instrument 22 and that adjustment of the opening of the camera diaphragm 13 correspondingly regulates the transmission of light through the auxiliary diaphragm 19 to the cell 20 to vary the reading of the measuring instrument 22. The device is adjusted in such manner that when the pointer 24 concides with the fixed mark 25 the settings of the shutter 12 and the diaphragm 13 will be so related as to provide proper exposure.

Other factors influencing the choice of correct exposure may be taken into account by means of further adjustable resistances, or by placing different filters over the cell 29, but I prefer to do so by varying the relation between the openings in the diaphragms 13 and 19. The last mentioned arrangement is illustrated in Figs. 1 and 3 as comprising a releasable coupling between the adjusting discs 17 and 18 which permits adjustment of the relation between the discs, as for example, in accordance with the sensitivity of the film being used. For this purpose, handles 52 and 53 may be pressed to displace forwardly the disc 18 to remove it from meshing engaging relation with the disc 17 thereby permitting any one of the indicating marks F, N or S, denoting fast, normal and slow film speeds, respectively, to be brought opposite the single mark on the disc 17 after which the handles 52 and 53 are released and the two discs returned to meshing engagement.

Fig. 2 shows an arrangement resembling that above described in connection with Fig. 1, the main difference being that the light falling on the photo cell is under the joint control of the adjusting movement of the camera lens diaphragm and the adjusting movement of the shutter speed setting device. As shown in this figure, a photo cell is provided with a diaphragm having laminations 31, one end of which laminations is connected with a rotatable ring 32 and the other end is connected to a rotatable ring 33 whereby the effective opening of the diaphragm as determined by the laminations 31 will depend upon the relative positions of the two rings 32 and 33. By means of this diaphragm, it is possible to take into account two independent factors, and in the arrangement shown the ring 32 is coupled to the adjusting ring 35 of a diaphragm 34 provided in front of the camera lens and the ring 33 is coupled with the adjusting disc 36 of the device for setting the speed of the shutter. The photo cell 30 is connected to the coil of a measuring instrument 37 which is provided with a pointer 38 preferably extending into a position to be observed through the camera view finder as was the case in the arrangement described in connection with Fig. 1. In the present case when the pointer 38 is brought to a predetermined reading indicated by the mark 39, the diaphragm 34 and the shutter speed setting disc 36 will be properly adjusted for correct exposure.

When using the arrangement shown in Fig. 2 other factors influencing the final setting of the exposure control devices of the camera, such as the sensitizing of the film or the use of various filters over the camera lens, may be taken into account by adjusting the mesh of the several geared rings or by making the reference mark 39 displaceable by some suitable adjusting mechanism 40 with which the reference mark 39 may be moved to other positions such as those indicated at 41 and 42. With this arrangement when the camera diaphragm and shutter speed are adjusted to bring the meter pointer 38 to some different predetermined reading such as that indicated at 41, the final adjustment will have taken into account some other factor influencing the exposure to be given.

In the arrangements above described a separate light regulating device has been employed in front of the light sensitive cell as an aid in bringing about proper adjustment of the exposure control devices. Such separate light control device may be disposed with according to the form of the invention now to be described.

Figure 5:
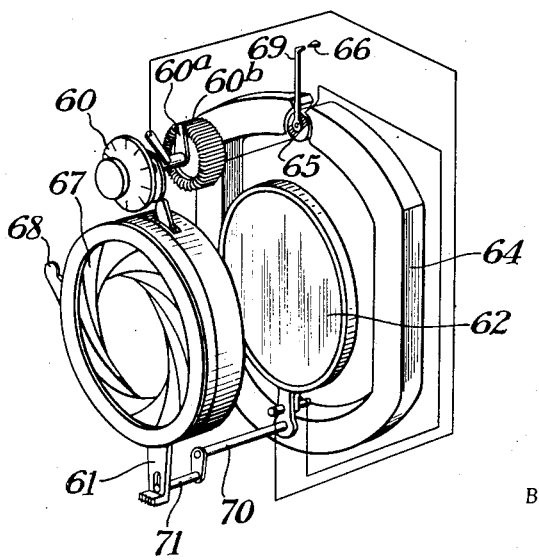
Fig. 5 is a perspective view similar to Fig. 4 but with the camera casing and lens removed.

In Figs. 4 and 5 a camera embodying one form of the invention is shown in which the photo cell is so arranged in the interior of the camera that it may be moved into and out of the path of the light passing through the object lens of the camera. This camera includes a casing 58 provided in its front wall with an object lens 59. A disc 60 is available for adjusting the speed of the shutter which may be of any known type having a snapping lever 61 and a suitable arm 61a for winding the shutter mechanism. Within the camera casing 58 is positioned a magnet 64 of an electrical measuring instrument having a coil 65 arranged in its field through which coil the current of a photo cell 62 is adapted to flow. The meter coil 65 is provided with a movable pointer 69 which is positioned in the window of the camera finder 63 and cooperates with a fixed mark 66 for indicating when the output of the cell 62 has been brought to a predetermined value. Certain of the above mentioned parts are more clearly shown in Fig. 5 in which the diaphragm 67 and its adjusting arm 60 are shown. The shutter speed control disc 60 is provided with a contact 60a which slides over a resistance coil 60b included in series with the measuring instrument coil 65 and with the photo cell 62.

The photo cell 62 is fixed on a shaft 70 a bent end 71 of which is connected with the shutter snapping lever 61 in such a manner that when this lever is displaced to the left as shown in the drawings, the photo cell 62 is moved to the position 72 shown in broken lines in Fig. 4 in which position it is no longer in intercepting position for the light transmitted by the lens 59. The initial movement of the snapping lever 61 moves the cell 62 to one side and when the lever 61 is moved further, it actuates the shutter snapping mechanism in any well known manner. When the lever 61 is returned to its initial position, the cell 62 will also return to its initial position as shown in Figs. 4 and 5.

In the arrangement just described the diaphragm employed in the camera object lens controls the light reaching the cell during the measuring operation so that no special arrangement is necessary as was the case in the arrangements shown in Figs. 1, 2 and 3.

Figure 6:
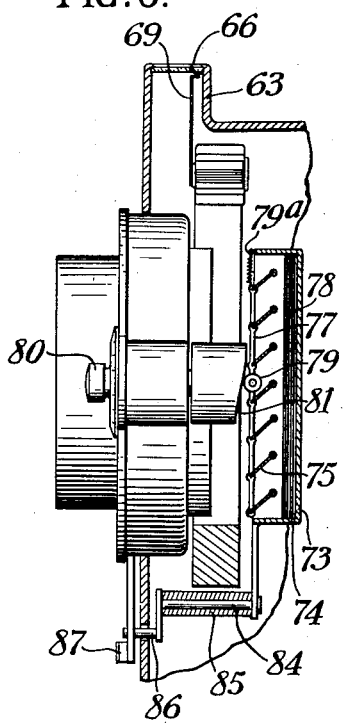
Fig. 6 is a detail view partly in section showing an arrangement for varying the light falling on the cell in accordance with two adjustable factors.

In the arrangement shown in Figs. 4 and 5 the adjustment of the shutter speed influences the reading of the electric photometer by adjusting a resistance in its circuit. A corresponding adjustment of the meter reading may be obtained by varying the light falling on the cell in accordance with the adjustment of the shutter speed and one suitable arrangement for doing this is shown in section in Fig. 6 where for the sake of simplicity only such parts have been shown as are designed differently from the parts shown in Figs. 4 and 5. In this arrangement a light sensitive cell 78 is mounted in a suitable frame 73 which supports an annular member 74 which serves as a frame or support for a suitable mechanism, adjustment of which regulates the transmission of light to the cell 78. This light adjusting mechanism is here shown as consisting of a plurality of adjustable flaps 75 each of which is supported on a rotatable pivot in much the same manner as have similar devices been employed on search lights. The positions of the flaps 75 on their pivots are adjusted by means of a member 77 connecting the free ends of the flap 75. This connecting member 77 is provided with a suitable lug or cam follower 79 which by means 76 of a coil spring 79a is held in engagement with a cam 81 provided on the shaft of the adjusting knob 80 for setting the speed of the shutter. Due to this arrangement the flap 75 will at all times occupy positions corresponding to the setting of the shutter speed as determined by the position of the cam 81. The photo cell 78 and its light regulating mechanism comprising the flaps 75 are mounted on a shaft 84 supported in a suitable bearing 85 and having at its forward end an eccentrically extending arm 86 which interlocks with the shutter snapping lever 87 whereby the cell 78 and its associated light regulating means will be moved out of the path of light transmitted by the camera objective upon actuation of the shutter snapping lever 87 in the same manner as the cell is moved in the arrangement shown in Figs. 4 and 5.

In order to prevent stray light reaching the photographic material a suitable light tight barrier will, of course, be provided to cooperate with the cell 62 for this purpose and some suitable means such as a pin 57 carried by the cell mount or some other part movable with the cell 62 is arranged to hold the shutter leaves open during the time the cell 62 is in position behind the camera lens.

In some of the arrangements described, the reading of the electrical measuring instrument has been influenced by regulating the light falling on the cell and by regulating a resistance in the circuit connecting the cell to the measuring instrument. It is to be understood that the shutter speed adjusting movement may be employed to regulate the light falling on the cell and that the diaphragm adjusting movement may be employed for regulating a resistance in the cell circuit.

In each of the embodiments described, an electrooptical device has been employed for indicating to the user when the several exposure control devices are properly correlated for proper exposure. It is, of course, obvious that either the diaphragm opening or the shutter speed may be preselected and the other then adjusted to bring about the desired reading to insure proper exposure.

Although for the purpose of illustrating my invention I have described in detail certain specific embodiments thereof, it is to be understood that I do not wish to be limited thereby but to include within the scope of my invention all modifications which fall within the appended claims.

What I claim as new and desire to secure by Letters Patent of the United States is:

1. In a device for the control of illumination in photographic cameras, in combination an object lens and an adjustable diaphragm therefor, a shutter having a speed control device, a measuring instrument, a photo-cell connected to said instrument, an adjustable diaphragm in front of the photocell, a positive connection between the diaphragm of the object lens and the diaphragm of the photocell, and an adjustable resistance in the circuit of the photocell, the control mechanism of the resistance being positively connected with the speed control device of the shutter.

2. In a device for the control of illumination in photographic cameras, in combination a measuring instrument, a photo-cell connected to said instrument, an adjustable diaphragm in front of the photo-cell, a movable pointer being arranged opposite to a fixed mark in the measuring instrument, an object lens and an adjustable diaphragm therefor, a disconnectable positive connection between the diaphragm of the photo-cell and the diaphragm of the object lens and an adjustable resistance in the circuit of the photo-cell.

3. In a device for the control of illumination in photographic cameras in combination an object lens and a shutter therefor, a photo-cell arranged in the ray path of the light passing through the object-lens, an electrical measuring instrument in the circuit of the photo-cell, means for deflecting the photo-cell from the light-ray path during the exposure, means for adjusting the speed of the shutter, an adjustable resistance in the circuit of the photo-cell, and a coupling means between said shutter speed adjusting means and the adjustable resistance whereby the current of the photo-cell is controlled in accordance with the shutter speed setting.

4. In a device for the control of illumination in photographic cameras, in combination an object lens and a shutter therefor, a photo-cell arranged in the light-ray path of the object lens of the photographic camera, the said photo-cell being rotatable around an axle, means for turning the photo-cell around this axle, means for actuating said shutter, and a positive connection between the deflecting device of the photo-cell and the shutter actuating means.

5. In a device for the control of illumination in photographic cameras in combination an objective, a diaphragm for governing the transmission of light through the objective, a shutter for controlling the exposure period, a light sensitive cell adapted to be activated in accordance with the luminous flux transmitted by the objective and its diaphragm, an electrical measuring instrument connected to the light sensitive cell, means for adjusting the speed of the shutter, an adjustable member for varying the ratio between the luminous flux transmitted by said objective and its diaphragm and the current supplied to the measuring instrument, and a coupling means between said shutter speed adjusting means and said adjustable member.

6. In a device for the control of illumination in photographic cameras in combination an objective, an electro-optical system including an element having an operative position in the path of the light transmitted by the objective, means for moving said element from its operative position, a shutter for controlling the exposure period, means for actuating the shutter, and means for jointly controlling the means for moving said element from its operative position and said shutter actuating means.

7. In a photographic camera in which an electrical measuring instrument determines the exposure period, an objective, a diaphragm for governing the transmission of light through the objective, a light sensitive cell connected to the electrical measuring instrument, a shutter for controlling the exposure period in the camera, shutter actuating means and a control member therefor, movable means connected to said control member and so arranged that in one position light transmitted by the objective falls on said cell and adapted to be moved upon operation of said control member to a position where no light falls on the cell.

8. A photographic camera including a diaphragm, a shutter and a member movable to actuate the shutter, a light sensitive device including a photo cell, movable means adapted to occupy alternatively two positions in which said cell receives and does not receive, respectively, light transmitted by the diaphragm, and coupling means operative upon movement of said shutter actuating member for moving said movable means to the position where the cell does not receive light.

9. Photographic apparatus including an objective, a diaphragm for governing the transmission of light through the objective and a shutter for controlling the exposure period, a light sensitive cell adapted to be activated in accordance with the luminous flux transmitted by the objective and its diaphragm, an electrical indicating instrument connected in circuit with said cell, an adjustable resistance in circuit with said instrument and said cell, means for adjusting the speed setting of the shutter, and means operated by the shutter adjusting means for correspondingly adjusting said resistance.

10. In a photographic camera in which a predetermined reading of a light sensitive device indicates that the camera is set for proper exposure, a shutter, means for adjusting the interval setting of the shutter, a diaphragm, means for adjusting the opening of the diaphragm, a light-sensitive cell, indicating means for giving a reading corresponding to the cell current, a device adjustable for varying the transmission of light to said cell, and means coupling said adjustable device for joint control by the shutter adjusting means and the diaphragm adjusting means.

11. In a photographic camera in which a predetermined reading of a light sensitive device indicates that the camera is set for proper exposure, two independent members adjustable to alter the exposure setting of the camera, a light sensitive device including an indicating meter connected to a light sensitive cell for giving a reading, means adjustable for governing the transmission of light to said cell, each of said independent adjustable members being adapted to effect an adjustment of said means, whereby the reading of said meter is changed.

ÖDÖN RISZDORFER.